US005696349A

United States Patent [19]
Bera

[11] Patent Number: 5,696,349
[45] Date of Patent: Dec. 9, 1997

[54] WEDGE-LOCKABLE FIRE-RETARDANT POKE-THROUGH SERVICE FITTING

[75] Inventor: John Bera, Kinnelon, N.J.

[73] Assignee: Raceway Components, Inc., Williamstown, W. Va.

[21] Appl. No.: 409,838

[22] Filed: Mar. 27, 1995

[51] Int. Cl.$^6$ .................................................. H02G 3/22
[52] U.S. Cl. .................................. 174/48; 52/220.8
[58] Field of Search .................. 52/220.6, 220.8; 174/48, 58, 50

[56] References Cited

U.S. PATENT DOCUMENTS

| 4,091,231 | 5/1978 | Sotolongo | 174/48 |
|---|---|---|---|
| 4,264,779 | 4/1981 | Rhodes et al. | 174/48 |
| 4,336,416 | 6/1982 | Goodsell | 174/48 |
| 4,477,694 | 10/1984 | Kohaut | 174/48 |
| 4,667,579 | 5/1987 | Daw | 98/33.1 |
| 5,272,278 | 12/1993 | Wuertz | 174/48 |
| 5,545,458 | 8/1996 | Fukushima et al. | 428/117 |

Primary Examiner—Kristine L. Kincaid
Assistant Examiner—Dhiru R. Patel
Attorney, Agent, or Firm—Fulwider Patton Lee & Utecht, LLP

[57] ABSTRACT

The service fitting may be installed in the floor of a structure. It enables activation of power, communication, and/or data services at the fitting location. It includes wedge locks, which releasably engage the floor opening. The wedge locks are operable from above the floor, to engage with and release from the floor opening. Upon engaging the floor opening, they resist unauthorized upward pulling of the fitting. Upon release from engagement, they enable authorized removal of the fitting, without requiring potentially damaging efforts for access thereto through a limited access ceiling of the floor below. The fitting further includes elements for retarding transmission of fire through the floor opening and the fitting. They maintain the fire rating of the floor at substantially the same level with or without the floor opening and fitting in the floor.

38 Claims, 4 Drawing Sheets

WEDGE-LOCKABLE FIRE-RETARDANT POKE-THROUGH SERVICE FITTING

BACKGROUND OF THE INVENTION

1. Field of the Invention

This invention relates generally to in-floor service fittings. It relates specifically to a wedge-lockable fire-retardant poke-through service fitting.

2. Description of the Related Art

Service fittings may be installed in a floor such as a concrete slab or steel deck floor, in a structure such as an office building or retail store. They enable activation of power, communication, and/or data services at the fitting location.

Service cables loosely placed in the plenum between the ceiling for the floor below and the floor above may be pulled from the plenum and associated with the service fitting, for activation of services.

Power service cables may be connected to a receptacle in the service fitting, to provide in-floor outlets for power plugs for electrical and electronic equipment.

Communication and/or data service cables may be passed through passages in the service fitting, for connection to communication and/or data equipment.

Access to service fittings installed in the floor has been attained through the ceiling below, for repairing or removing the service fitting.

Service fittings may be removed for abandonment of the location, in view of changed conditions such as relocation of devices serviced thereby.

Drop ceilings in buildings enable ready access to the plenum and service fittings through removal of ceiling panels.

However, ceilings other than drop ceilings may provide only very limited access, such as sheet rock ceilings in an older retail store building. Access to such ceilings may only be attained by cutting therethrough, and repairing the ceiling after work is completed.

This process is very difficult and time consuming, and subjects the ceiling to significant potential damage.

These problems are particularly acute for activation and deactivation of service fittings in locations such as cashiering locations for seasonal requirements of retail stores.

Previously, a service fitting has been secured in a floor opening by a retainer disk, comprised of flexible material, mounted in the service fitting. Such a retainer disk is shown in U.S. Pat. No. 4,770,643.

The diameter of the retainer disk is greater than the diameter of the opening in which the service fitting is installed. The retainer disk includes peripheral teeth formed therein.

When the service fitting is pushed into the floor opening for installation of the service fitting, the peripheral teeth of the retainer disk flex upwardly, allowing the service fitting to be pushed downwardly.

Once in position, if the service fitting is lifted, the peripheral teeth dig into the wall of the floor opening, preventing lifting of the activated service fitting and preventing the dangers which would result therefrom.

Such service fittings are repaired or replaced by removing the service head and pushing the fitting through the floor opening into the plenum, for access thereto through the ceiling below.

However, with a limited access ceiling such as sheet rock, access to the service fitting for repair or removal through the ceiling below is a serious problem.

Further, in-floor service fittings have previously been clamped in a floor opening by operation from above the floor, by advancing a screw bearing directly on a shaped clamping member, as shown in U.S. Pat. No. 3,841,673.

However, such clamping member, once deformed, fixedly clamps the service fitting in the floor opening. It is not releasable for removal of the service fitting.

Also, in-floor service fittings have previously been releasably retained in a floor opening by operation from above the floor, by advancing or retracting a screw bearing directly on a flexible shaped retainer member, mounted on a plate for separating the service cables, as shown in U.S. Pat. No. 4,477,694.

However, such retainer member grips the wall of the floor opening proximate the top of the in-hole portion of the service fitting. Upon pulling the service fitting upwardly, the grip of the retainer member mounted on the separating plate for the service cables proximate the top of the in-floor portion of the service fitting retains the service fitting for only the relatively short distance from the retainer to the top of the floor opening.

SUMMARY OF THE INVENTION

The service fitting of the invention overcomes the above problems and others associated with prior service fittings.

It includes wedge locks, which releasably engage the floor opening upon installation of the service fitting therein. The wedge locks are located external to the fitting, and are positioned so as to enable ready access and operation from above the floor. Such location and positioning enable installation and authorized removal from above the floor. This avoids the need to obtain access to the fitting through the ceiling below. For ceilings comprised of difficult to penetrate material such as sheet rock, attempted access to the fitting through the ceiling poses a serious danger of damaging the ceiling.

The wedge locks also interfere with unauthorized lifting of the fitting from its position installed in the floor opening. They are mounted on the portion of the fitting insertable in the floor opening remote from the end to which the service head is connectable. If the service fitting is pulled upwardly, the wedge lock resists upward movement and retains the fitting in the floor opening for the relatively long distance from the remote end of the insertable portion of the fitting to the top of the floor opening.

The wedge locks further releasably engage the floor opening for enabling authorized removal of the fitting.

The fitting further includes elements for retarding the transmission of heat and flame from a fire through the floor opening and the fitting to the floor above. They maintain the fire rating of the floor at substantially the same level with or without the floor opening and fitting in the floor.

DESCRIPTION OF THE PREFERRED EMBODIMENTS

Figure 1:
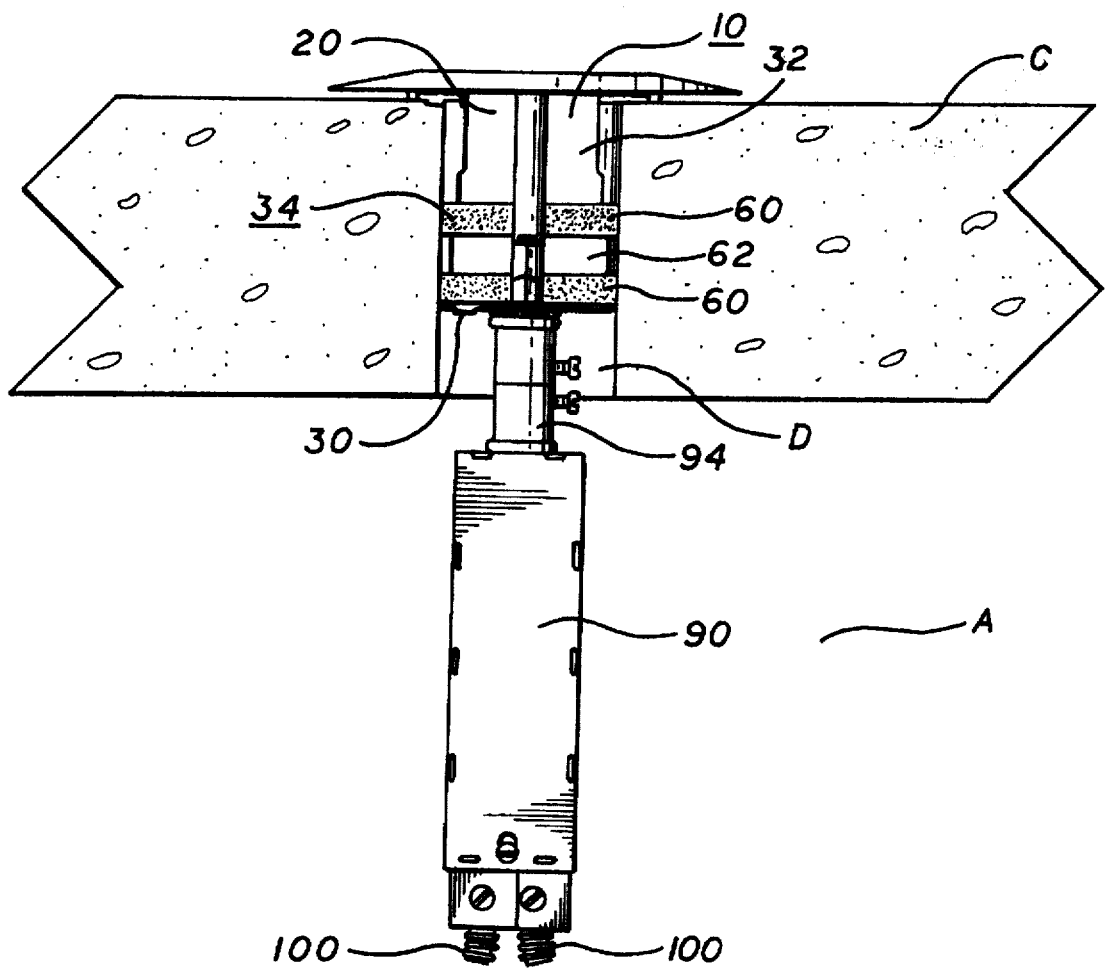
FIG. 1 is an elevational partly-sectional view of a first embodiment of the service fitting of the invention, installed in a floor opening.
Figure 1:
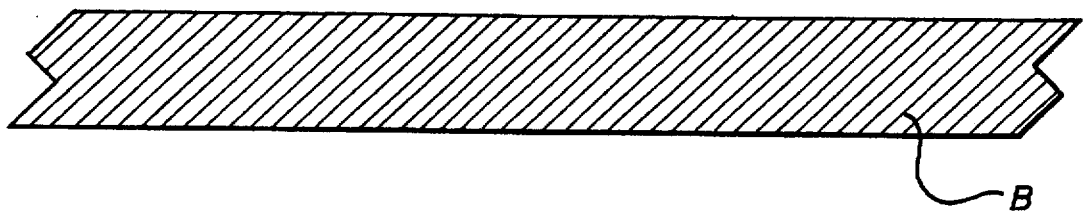

The invention comprises a fitting 10, for activation of service cables (not shown) loosely positioned in a limited access plenum A between a ceiling B for the floor below and a floor C, as shown in FIG. 1. Fitting 10 may be installed in a building such as a commercial office building or retail department store. Ceiling B may comprise a sheet rock ceiling, which provides limited accessibility to plenum A. The service cables to be activated by fitting 10, loosely positioned in plenum A, may include power cables, communication cables and/or data cables. Floor C may be fire-rated.

Fitting 10 may be releasably secured in an opening D formed in floor C at a desired location therein, and is readily accessible for secure retention therein and efficient removal therefrom. It releasably engages floor opening D, and is operable for releasable engagement from above floor C, externally on fitting 10.

Fitting 10 is further adapted to retard the transmission of heat and flame from a fire from the floor below, through ceiling B, and floor opening D and fitting 10, to floor C. It is operable such that the fire rating of floor C is substantially the same with or without floor opening D and fitting 10 therein.

Figure 2:
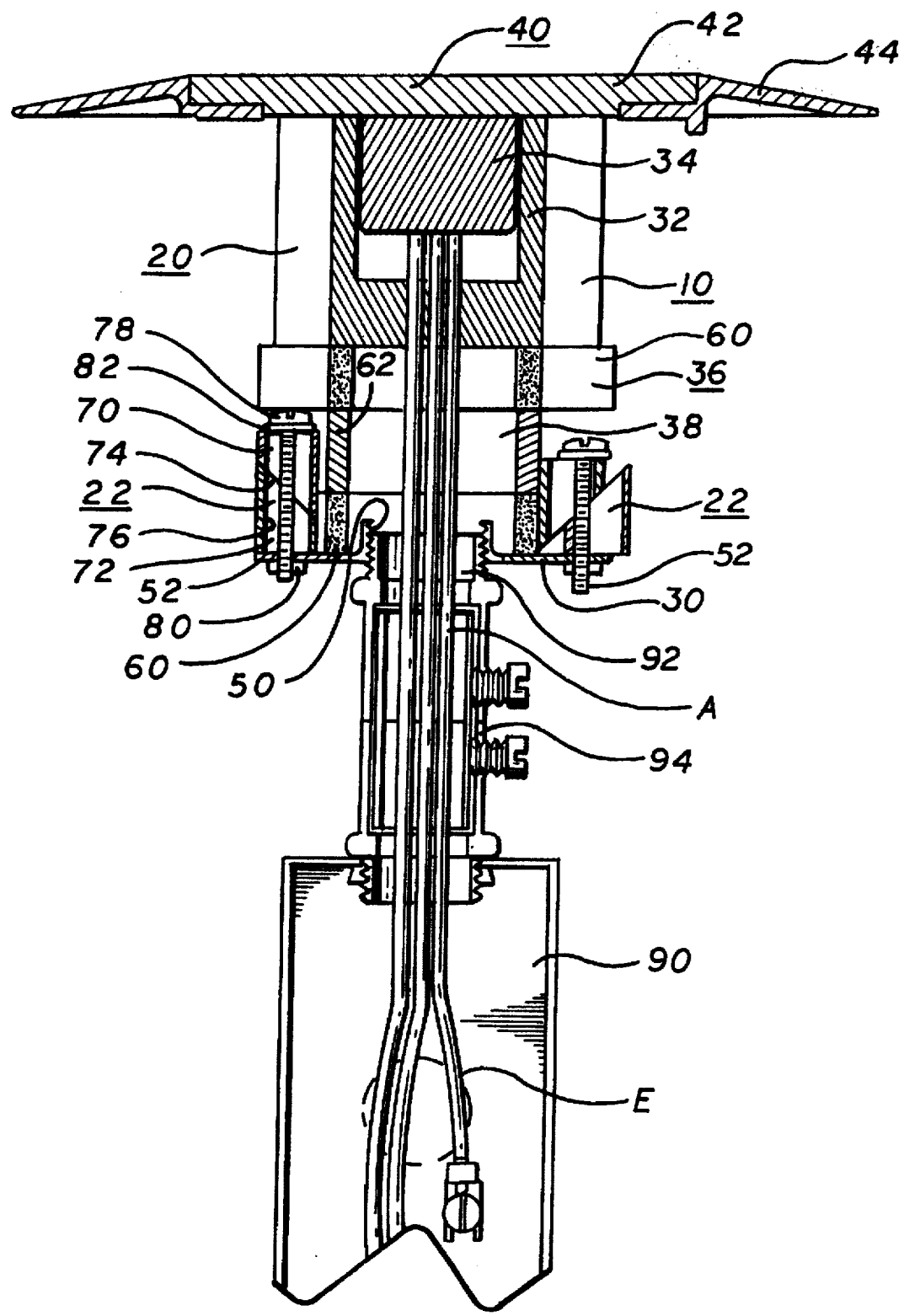
FIG. 2 is an elevational partly-sectional partly-fragmentary view of the service fitting.

Fitting 10 comprises an insert 20, for activating service cables, and for retarding the transmission of heat and flame from a fire. It further includes a pair of wedge locks 22, 22, for interfering with unauthorized lifting of fitting 10. Wedge locks 22, 22 releasably engage floor opening D for enabling authorized removal operation from above floor C, as shown in FIGS. 1 and 2. They are mounted external to insert 20, at the end of insert 20 remote from the top thereof.

Insert 20 includes a bottom plate 30 for supporting wedge locks 22, 22 and an upper housing 32, for enclosing a power receptacle 34 to which internal power cables F are connected. It further includes fire retarding elements 36, mounted between upper housing 32 and bottom plate 30. It also includes a raceway 38 extending therethrough for passing internal power cables F therethrough connected to power receptacle 34 which includes end terminals for connection of power cables thereto.

Fitting 10 further includes a top assembly 40 for activating fitting 10, connectable to insert 20. Top assembly 40 extends above floor C so as to be substantially flush with the top of a carpet (not shown) which may be installed on floor C. It does not extend substantially above the top of the carpet. Wedge locks 22, 22 are mounted on insert 20 at the end of insert 20 remote from the end to which top assembly 40 is connectable.

Top assembly 40 includes a service head 42, a generally disk-shaped finishing ring 44, and receptacle 34 which includes terminals for connection of power cables thereto. Service head 42 includes outlets for receptacle 34, and may further include outlets for communication and/or data cables to pass therethrough. The outlets (not shown) for receptacle 34 face upwardly from service head 42, for connection of electrical and/or electronic devices thereto.

Bottom plate 30 of insert 20 has a central internally threaded opening 50, and a pair of outer threaded openings 52.

Fire retarding elements 36 of insert 20 include elements 60, comprised of fire retarding material such as intumescent material, generally disk-shaped, with a central opening substantially co-extensive with raceway 38. They further include insulating elements 62, comprised of insulating material such as phenolic material, generally disk-shaped, with a central opening substantially co-extensive with raceway 38.

Figure 3:
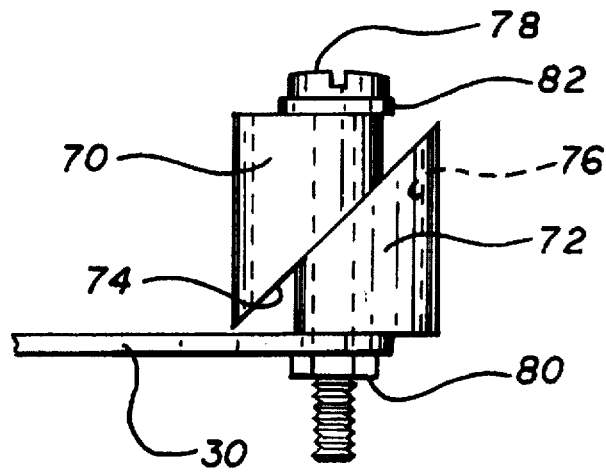
FIG. 3 is an elevational partly-fragmentary view of a bottom plate and a first embodiment of a wedge lock in the service fitting.
Figure 5:
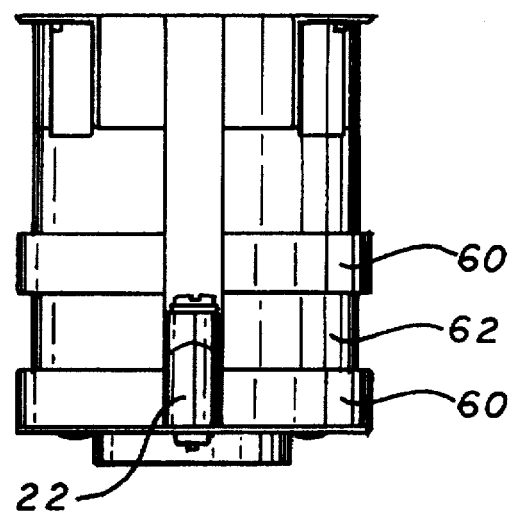
FIG. 5 is an elevational view of an insert and wedge lock in the service fitting.
Figure 6:
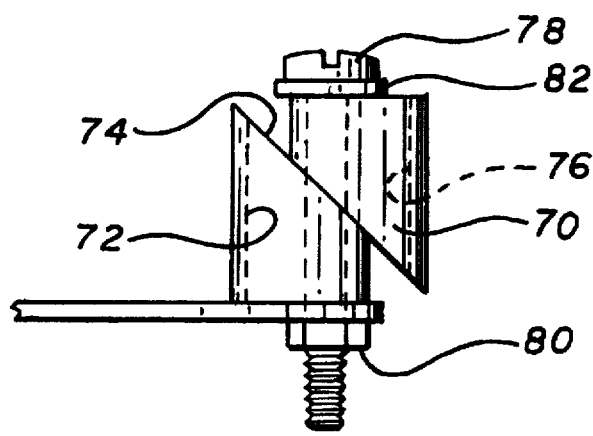
FIG. 6 is an elevational view of a second embodiment of a wedge lock in the service fitting.

Wedge locks 22, 22 each include a hollow element, including an upper part 70 and a lower part 72 as shown in FIGS. 2, 3, and 6. The hollow element from which parts 70 and 72 are formed may comprise a coupling rod. It may be slit at a generally medial portion along its length, to form a pair of facing surfaces 74, 74. Surfaces 74, 74 preferably extend at a generally forty-five degree angle to a plane transverse to the longitudinal axis of the hollow element, for enabling guided slidable movement of lower part 72 relative to upper part 70. Lower parts 72, 72 each further include a surface 76 extending generally parallel to the longitudinal axis of insert 20, for engaging floor opening D.

Wedge locks 22, 22 each further include a screw 78, extending through hollow upper part 70 and lower part 72, and threaded in bottom plate outer opening 52 with a nut 80 threaded thereon. Each screw 78, upon being advanced, generates sliding movement of lower part 72 relative to upper part 70 and into engagement with floor opening D. Each screw 78 also, upon being retracted, releases lower part 72 for retraction from engagement with floor opening D. They further each include a washer 82, between screw 78 and wedge lock upper part 70.

Fitting 10 further comprises a junction box 90, in which cables pulled from plenum A are connected to cables E. Junction box 90 includes a top opening 92, internally threaded, and bottom openings, for passage of service cables A. It may further include a barrier 94 for passage of multiple service cables separately therethrough. A connector 96 is threadably connected at one end in central opening 50 of insert bottom plate 30, and at the opposite end in top opening 92 of junction box 90, for interconnecting junction box 90 and insert 20.

Conduits 100 are connected to the bottom openings in junction box 90, for encasing power service cables therein.

Figure 4:
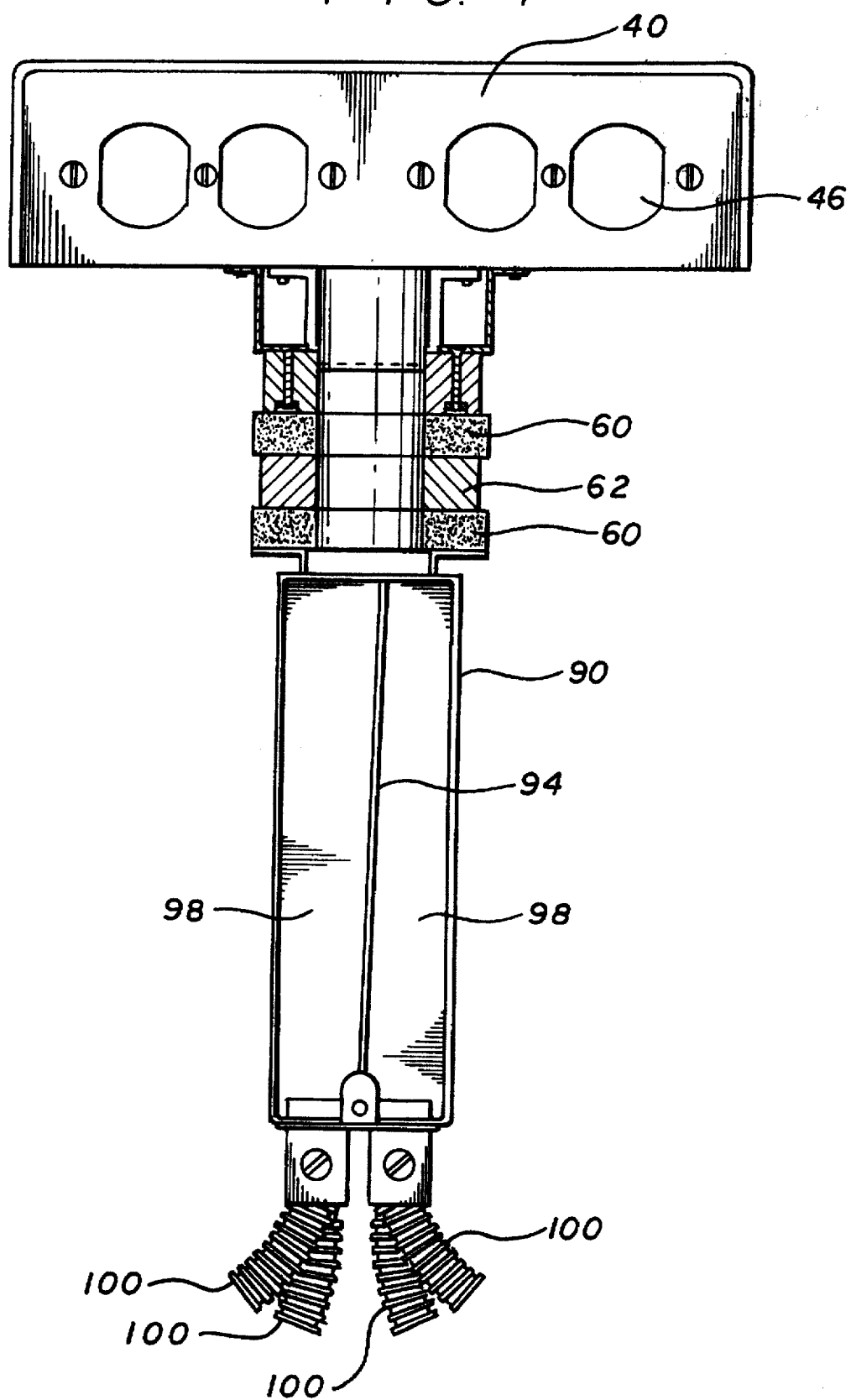
FIG. 4 is an elevational view of a second embodiment of the service fitting.

Fitting 10, in an alternate embodiment shown in FIG. 4, includes a top assembly 40 which is generally box-like in shape, extending substantially above floor C. Outlets 46 are located on the front face of assembly 40, for connection of electrical and/or electronic devices thereto. Barrier 94 divides junction box 90 into separate passageways 98, 98, for separate passage of service cables therein. Conduits 100 encase service cables therein.

Wedge locks 22, in an alternate embodiment shown in FIG. 6, includes upper part 70 which is slidably movable relative to lower part 72. Upon advancing screw 76, upper part 70 engages floor opening D. Upon retracing screw 76, upper part 70 releases from engagement with floor opening D.

To install fitting 10 in floor C, at a desired location for service activation, floor C may be drilled at the desired location for access to the services, as by core drilling, to form floor opening D.

The power, communication and/or data service cables loosely positioned in plenum A may then be pulled from plenum A for connection to fitting 10. Power cables may be pulled into junction box 90 for connection to internal power cables E, to activate receptacle 34. Communication and/or data cables may be pulled through outer channels (not shown) in insert 20 and in service head 42, for connection to communication and/or data equipment.

Insert 20 and attached junction box 90 may then be oriented relative to floor opening D, to be pushed thereinto until the top thereof rests on floor C with the top of service head 42 substantially flush with the top of a carpet which may be installed on floor C.

Each screw 78 in each wedge lock 22 external of insert 20 may then be advanced by turning a screwdriver applied to the head of screw 78 in a direction so as to advance screw 78 in nut 80. Advancing screw 78 causes lower part 72 of wedge lock 22 to slide through angled surface contact with upper part 70 into engagement with the wall of floor opening D, retaining insert 20 in floor opening D. Top activating assembly 40 may then be secured to insert 20 to complete installation and activation of fitting 10.

To remove fitting 10 from floor C as desired, to deactivate or abandon services at the location of fitting 10, top activating assembly 40 may then be disconnected from insert 20 and removed. Power service cables may be disconnected from insert 20, and communication and/or data cables may be pulled back through service head 42 and insert 20.

Each screw 78 in each wedge lock 22 may then be retracted by turning a screwdriver applied to the head of screw 78 in a direction so as to retract screw 78 in nut 80. Retracting screw 78 causes lower part 72 of wedge lock 22 to slide through angled surface contact with upper part 70 to release wedge lock 22 from engagement with the wall of floor opening D, releasing insert 20 from floor opening D. Insert 20 and attached junction box 90 may then be pulled from floor opening D, and an abandonment plate (not shown) may be installed over floor opening D to complete deactivation or abandonment of floor opening D.

In use, plugs (not shown) from electrical and/or electronic devices may be plugged into in-floor outlets (not shown) in service head 42 for receptacle 34. Also, communication and/or data cables (not shown) extending in-floor through top plate 42 may be connected to communication and/or data devices.

In operation, wedge locks 22 external of insert 20 enable ready access thereto from above floor C. This avoids efforts potentially damaging to ceiling B to obtain access through limited access ceiling B, comprised of a difficult to penetrate material such as sheet rock.

Wedge locks 22 further enable secure retention of fitting 10 in floor opening D, preventing unauthorized lifting of fitting 10 by interfering with upward movement thereof along floor opening D. They are located at the remote end of insert 20. They resist upward movement and retain fitting 10 in floor opening D over the relatively long distance from the remote end of insert 20 to the top of floor opening D. They also enable efficient authorized removal of fitting 10 from floor opening D.

Fire retarding elements 36 in insert 20 are activated upon occurrence of a fire below floor C, when heat and flame from the fire rise through ceiling B, plenum A, and floor opening D.

Fire retarding elements 60 are preferably comprised of intumescent material which absorbs heat. They are activated to expand into floor opening D, about insert 20, and about power cables A extending therethrough, under pressure. They form flexible foam seals, sealing openings, and forming very strong refractory chars. They seal openings to form efficient heat and smoke barriers, retarding transmission of heat and flame from the fire.

Insulating rings 62 are preferably comprised of phenolic material. They are activated to absorb heat, cure, crosslink, and emit water to dissipate heat in insert 20, upon activation by heat and flame from the fire, to provide better insulation.

Fire retarding elements 36 are thereby activated upon the occurrence of heat and flame from a fire to prevent heat and flame from the fire from being transmitted therethrough. This enables the fire rating of floor C to be substantially the same with or without floor opening D and fitting 10 therein.

Preferred embodiments of the invention have been set forth above, for the purpose of explaining the invention. However, it is to be understood that variations in such embodiments may be made which are nevertheless within the scope and spirit of the invention as set forth in the claims.

We claim:

1. A poke-through service fitting, for enabling service cables positioned in a plenum between a first floor and a ceiling below the first floor to be connected to the fitting, to enable services connectable to the fitting to be activated by the service cables, adapted to be installed in an opening formed at a selected location in the first floor, said fitting further releasably engages the first floor opening, and is operable for releasable engagement from above the first floor, and further is adapted to retard the transmission of heat and flame from a fire from a second floor below the first floor through the ceiling below the first floor and the first floor opening and the fitting to the first floor, comprising:

(a) an insert for enabling the service cables to be connected to the fitting, to enable services connectable to the fitting to be activated by the service cables, and for retarding the transmission of heat and flame from a fire through the first floor opening and the fitting; and (b) means for wedge locking the insert in the first floor opening comprising at least one wedge lock element, which includes a pair of parts, wherein one part is slidably movable relative to the other part for releasably engaging the first floor opening and securing the fitting in the first floor opening, operable from above the first floor, supported by the insert.

2. A fitting as in claim 1, in which the wedge locking means further comprise means for activating the at least one wedge lock element so as to engage the first floor opening, or release from engagement with the first floor opening.

3. A fitting as in claim 1, further comprising a service head, in which the insert includes an end to which the service head is connectable, and in which the wedge locking means are mounted on the insert at an end of the insert remote from the end to which the service head is connectable.

4. A fitting as in claim 1, in which the wedge locking means include a surface for interfering with movement along and engaging the first floor opening, extending generally parallel to a longitudinal axis of the insert.

5. A fitting as in claim 1, in which the insert includes a raceway for passage of the service cables.

6. A fitting as in claim 1, further comprising means for enabling location of a floor insert in the floor.

7. A fitting as in claim 1, in which the service cables comprise dual service cables, further comprising means for enabling the dual service cables to pass separately through the fitting.

8. A fitting as in claim 1, further comprising a junction box, secured to the insert so as to extend therefrom.

9. A fitting as in claim 1, in which the ceiling below the first floor is comprised of sheet rock material.

10. A fitting as in claim 1, in which the plenum comprises a limited access plenum.

11. A poke-through service fitting, for enabling service cables positioned in a plenum between a first floor and a ceiling below the first floor to be connected to the fitting to enable services connectable to the fitting to be activated by the service cables, adapted to be installed in an opening formed at a selected location in the first floor, said fitting further releasably engages the first floor opening, and is operable for releasable engagement from above the first floor, and further retard the transmission of heat and flame from a fire from a second floor below the first floor through the ceiling below the first floor and the first floor opening and one fitting to the first floor, comprising:

(a) an insert for enabling the service cables to be connected to the fitting to enable services connectable to the fitting to be activating by the service cables, and retarding the transmission of heat and flame from a fire through the first floor opening and the fitting; and (b) means for wedge locking the insert in the first floor opening comprising at least one wedge lock element, which includes a pair of parts, wherein one part is slidably movable relative to the other part, for releasably engaging the first floor opening and securing the fitting in the first floor opening, operable from above the first floor, supported by the parts therealong each comprising a member, slit at a point along a longitudinal axis and extending at an angle to an axis transverse to the longitudinal axis of the element so as to form the pair of parts, in which the slit forms facing surfaces in each part therebetween for slidable relative movement of the parts therealong and means for activating the at least one wedge lock element so as to engage the first floor opening, or release from engagement with the first floor.

12. A fitting as in claim 2, in which the activating means comprise a screw, threadably engagable with the at least one wedge lock element such that upon advancing the screw, the at least one wedge lock element move slidably and relatively for engagement with the first floor opening, and upon retracting the screw, the at least one wedge lock element release for retraction from engagement with the first floor opening.

13. A fitting as in claim 2, in which the insert further includes a bottom plate.

14. A fitting as in claim 2, in which the at least one wedge lock element are mounted external to the insert.

15. A fitting as in claim 3, in which the floor is fire-rated, and the fire transmission retarding means further maintain the fire rating of the first floor at substantially the same level with or without the first floor opening and the fitting in the first floor.

16. A fitting as in claim 3, in which the fire transmission retarding means include an element comprised of fire retarding material.

17. A fitting as in claim 3, in which the fire transmission retarding means include means for insulating the fitting.

18. A fitting as in claim 7, in which the dual service separate passage enabling means comprise a barrier, mounted in a insert raceway, for separating the insert raceway into a pair of channels, one channel for one type of said service cables, the other channel for another type of said service cables.

19. A fitting as in claim 7, in which the dual service cables comprise a plurality of wires.

20. A fitting as in claim 8, further comprising conduit in which the service cables are encased, which extend from the junction box.

21. A fitting as in claim 11, in which said one part of the at least one wedge lock element is operable for limited slidable movement relative to the other part.

22. A fitting as in claim 11, in which the surfaces of the parts extend at an angle of about forty-five degrees to an axis transverse to the longitudinal axis of the element.

23. A fitting as in claim 12, in which the actuating means further include a washer positionable intermediate the screw and the at least one wedge lock element.

24. A fitting as in claim 16, in which the fire retardant material comprises intumescent material.

25. A fitting as in claim 17, in which the insulating means are comprised of phenolic material.

26. A fitting as in claim 18, in which the at least one wedge lock element are mounted on the insert external to the insert raceway separated channels.

27. A fitting as in claim 18, in which one of the two types of said service cables comprises a power cable.

28. A fitting as in claim 18, in which one of the two types of said service cables comprises a communication cable.

29. A fitting as in claim 18, in which one of the two types of said service cables comprises a data cable.

30. A poke-through service fitting, for enabling service cables positioned in a limited access plenum between a first floor and a ceiling below the first floor to be connected to the fitting, to enable services connectable to the fitting to be activated by the service cables, adapted to be installed in an opening formed at a selected location in the first floor, said fitting releasably engages the first floor opening, and is operable for releasable engagement from above the first floor, and further is adapted to retard the transmission of heat and flame from a fire from a second floor below the first floor through the ceiling below the first floor and the first floor opening and fitting to the first floor, comprising:

(a) an insert for enabling the service cables to be connected to the fitting, to enable services connectable to the fitting to be activated by the service cables, and for retarding the transmission of heat and flame from a fire through the first floor opening and the fitting; and (b) means for wedge locking the insert in the first floor opening comprising at least one wedge lock element, which includes a pair of parts, wherein one part is slidably movable relative to the other part, for releasably engaging the first floor opening and securing the fitting in the first floor opening, operable from above the first floor, supported by the insert, further comprising means for activating the at least one wedge lock element so as to engage the first floor opening or release from engagement with the first floor opening.

31. A fitting as in claim 30, further comprising a service head, in which the insert includes an end to which the service head is connectable, and in which the wedge locking means are mounted on the insert at and end of the insert remote from the end to which the service head is connectable.

32. A fitting as in claim 30, in which the wedge locking means include a surface for interfering with movement along and engaging the floor opening, extending generally parallel to a longitudinal axis of the insert.

33. A poke-through service fitting, for enabling service cables positioned in a plenum between a first floor and a ceiling below the first floor to be connected to the fitting to enable services connectable to the fitting to be activated by the service cables, adapted to be installed in an opening formed at a selected location in the first floor, which fitting further releasably engages the first floor opening, and is operable for releasable engagement from above the first floor, and further retard the transmission of heat and flame from a fire from a second floor below the first floor through the ceiling below the first floor and the first floor opening and fitting to the first floor, comprising:
(a) an insert for enabling the service cables to be connected to the fitting to enable services connectable to the fitting to be activating by the service cables, and retarding the transmission of heat and flame from a fire through the first floor opening and the fitting; and
(b) means for wedge locking the insert in the first floor opening comprising at least one wedge lock element, which includes a pair of parts, wherein one part is slidably movable relative to the other part, for releasably engaging the first floor opening and securing the fitting in the first floor opening, operable from above the first floor, supported by the insert each comprising a member, slit at a point along a longitudinal axis and extending at an angle to an axis transverse to the longitudinal axis of the element so as to form the pair of parts, in which the slit forms facing surfaces in each part therebetween for slidable relative movement of the parts therealong, further comprising means for activating the wedge lock elements so as to engage the first floor opening, or release from engagement with the first floor.

34. A fitting as in claim 2, in which the activating means comprise a screw, threadably engagable with the at least one wedge lock element such that upon advancing the screw, the at least one wedge lock element move slidably and relatively for engagement with the first floor opening, and upon retracting the screw, the at least one wedge lock element release for retraction from engagement with the first floor opening.

35. A fitting as in claim 30, in which the insert further includes a bottom plate.

36. A fitting as in claim 30 in which the at least one wedge lock element are mounted external to the insert.

37. A fitting as in claim 33, in which each part of the at least one wedge lock element is operable for limited slidable movement relative to the other part.

38. A fitting as in claim 33, in which the surfaces of the parts extend at an angle of about forty-five degrees to an axis transverse to the longitudinal axis of the element.

* * * * *